Nov. 24, 1970     H. NÄDLER ET AL     3,542,624
APPARATUS FOR BUILDING UP PNEUMATIC VEHICLE TIRES
Filed March 6, 1967                               6 Sheets-Sheet 1
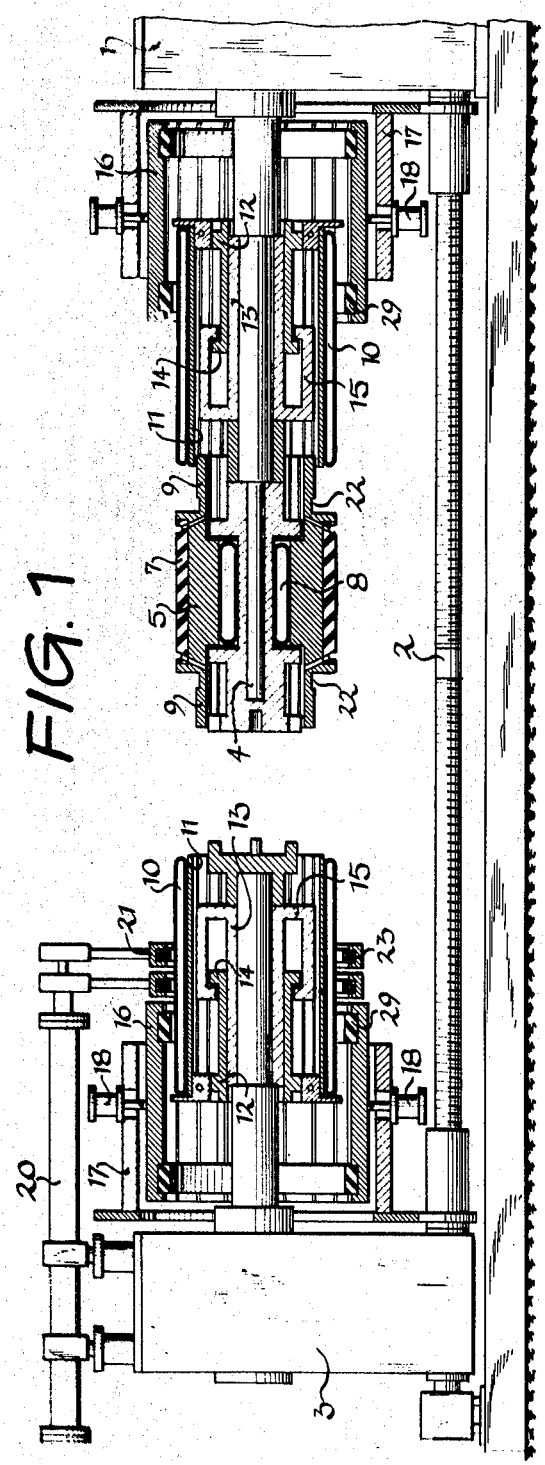
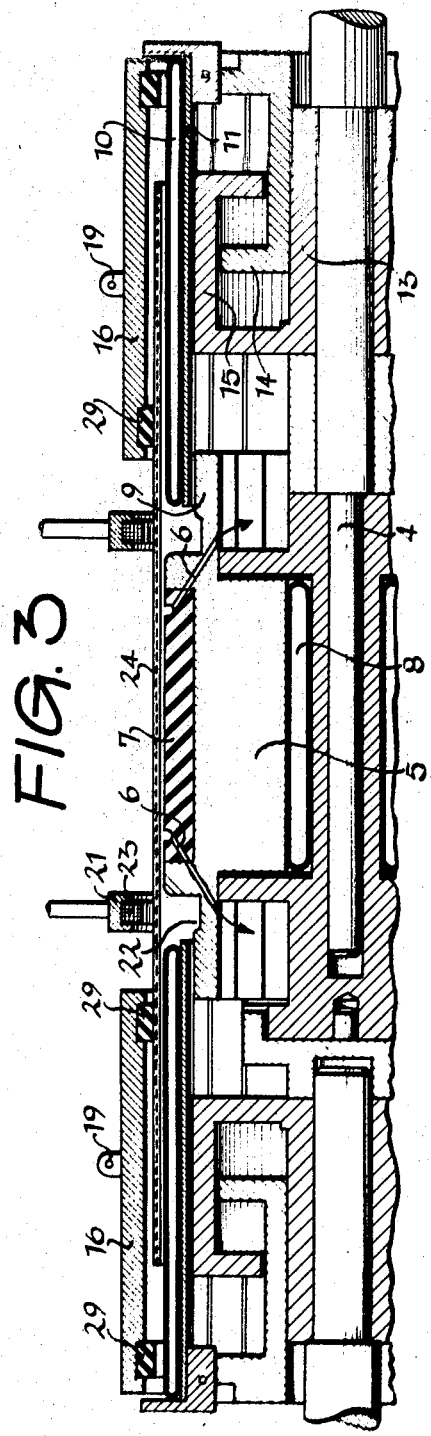
INVENTORS
HEINRICH NÄDLER
HILMAR GESCH
BY

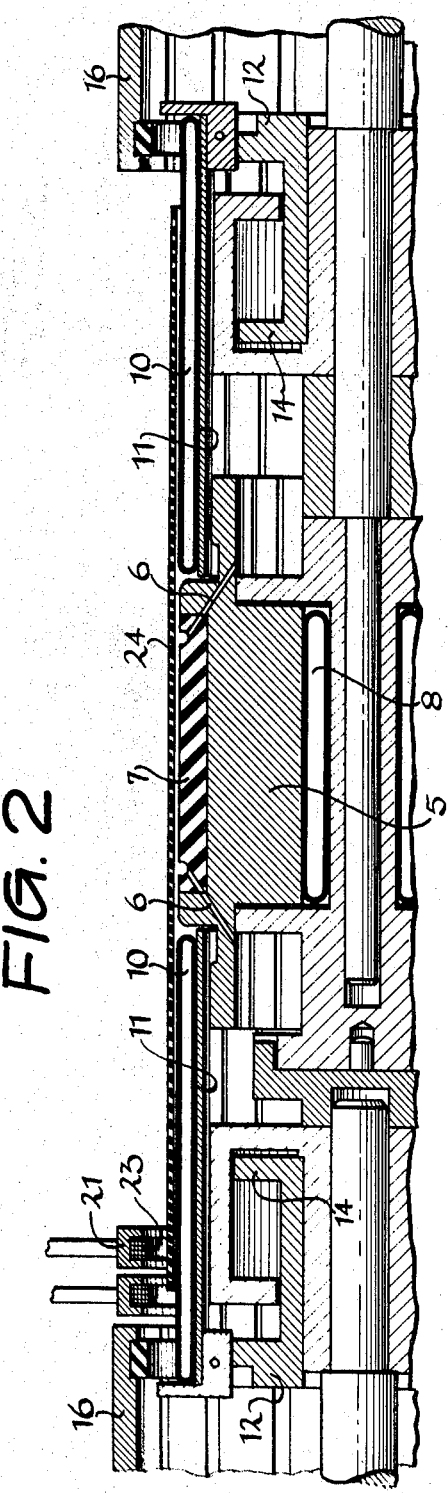

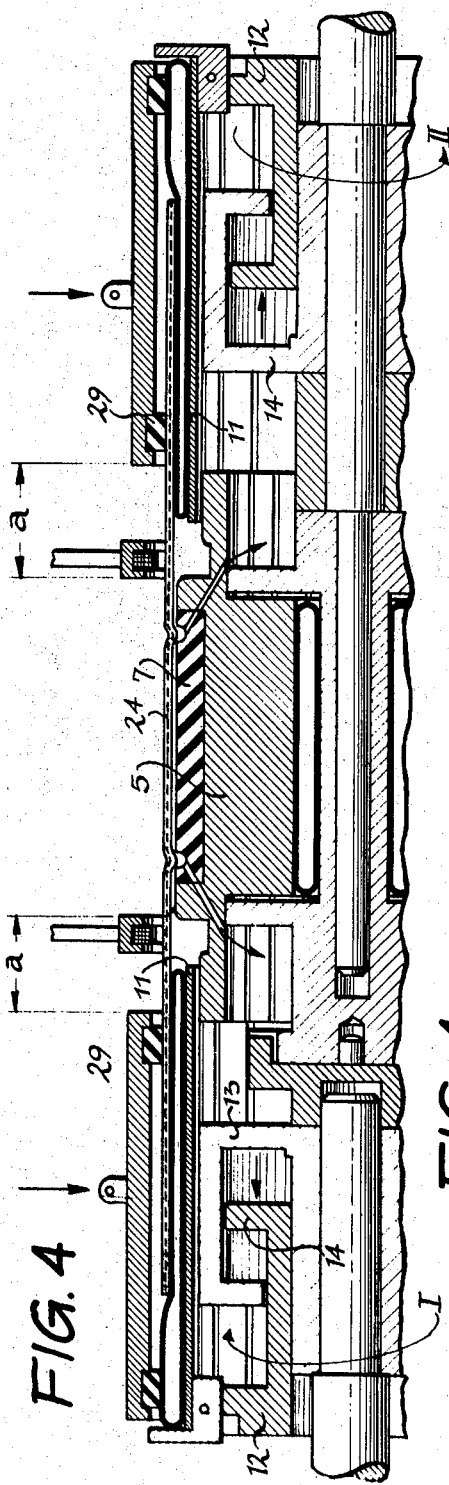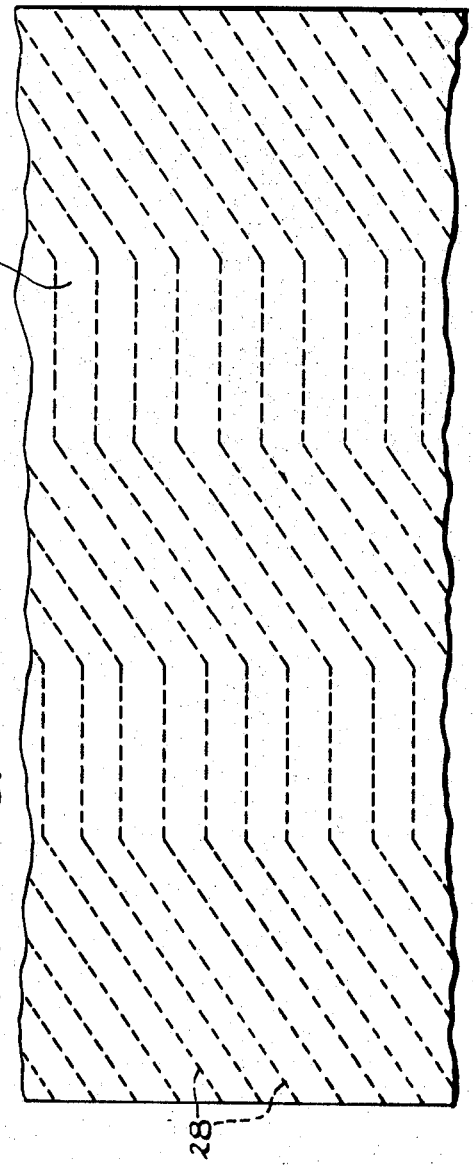

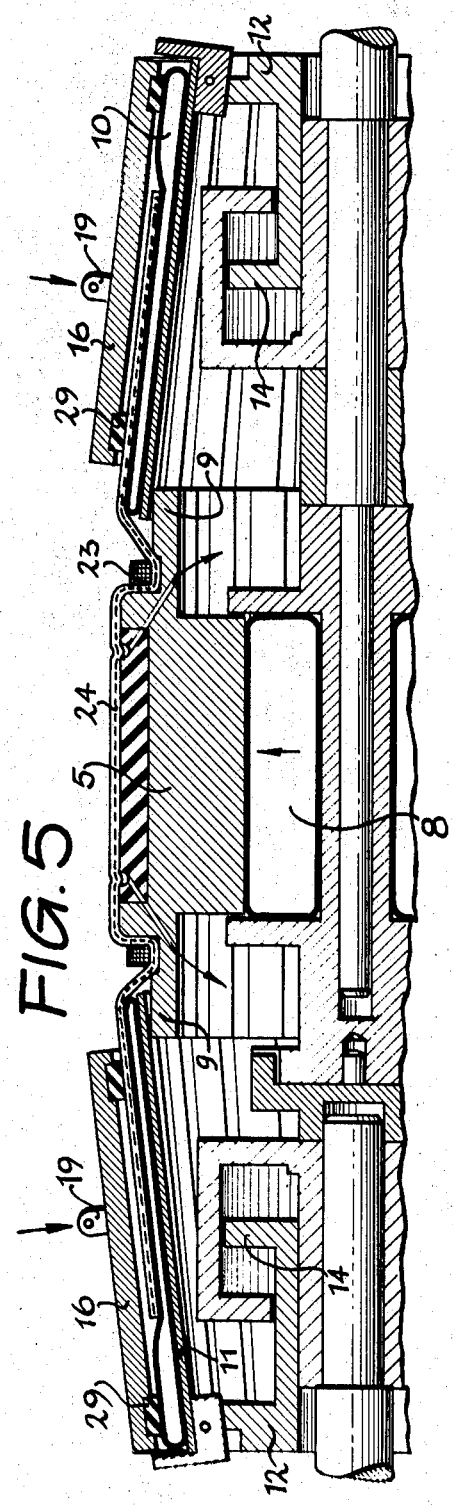
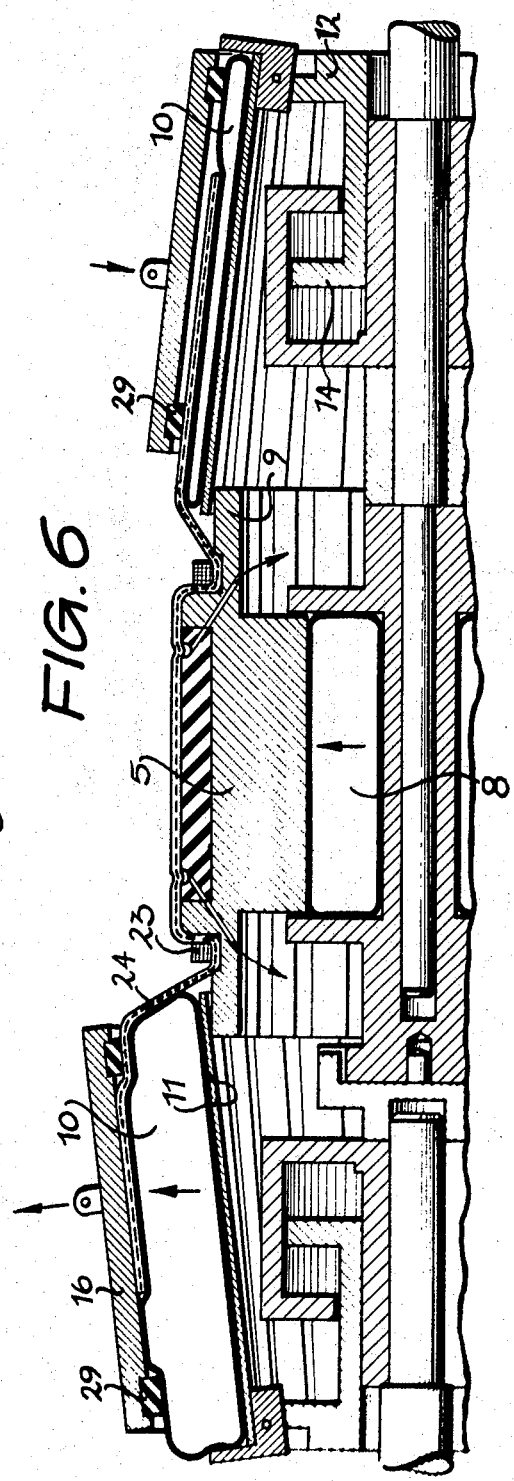
FIG.5
FIG.6

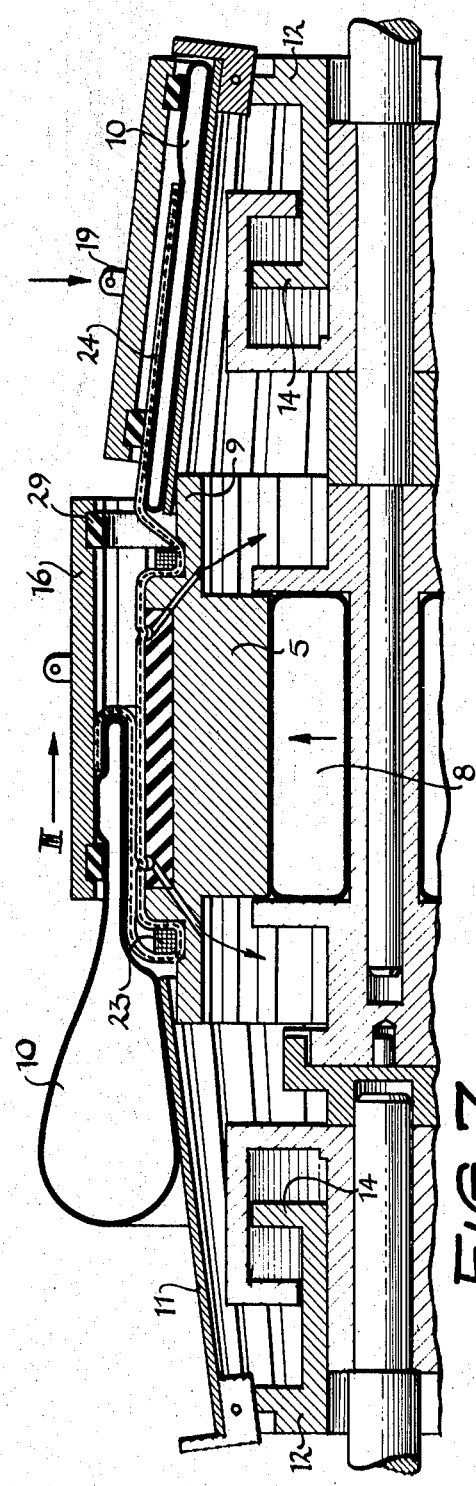
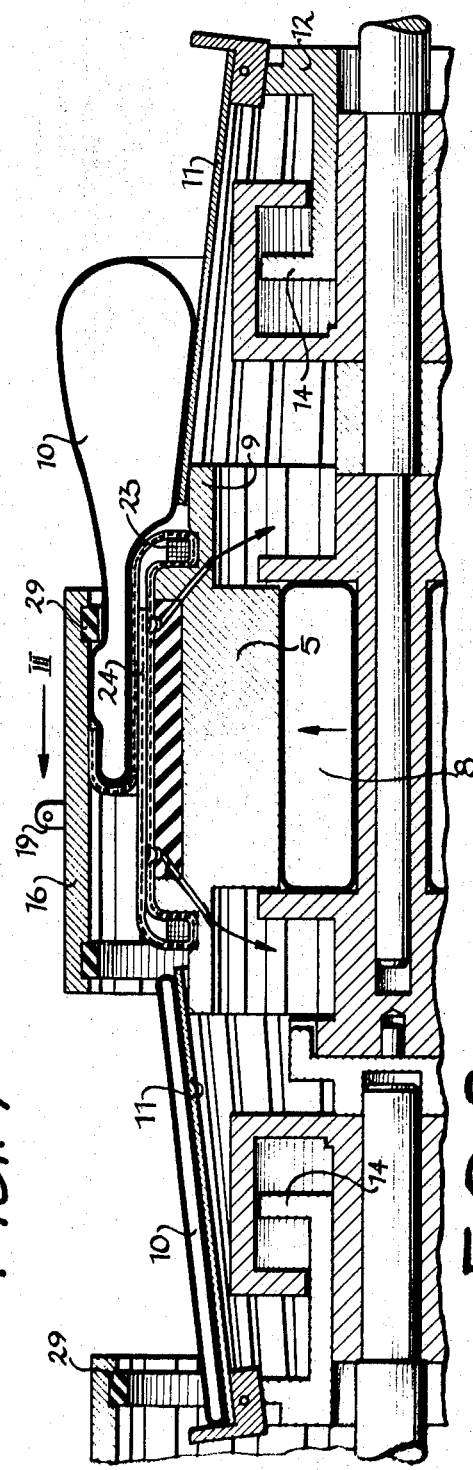

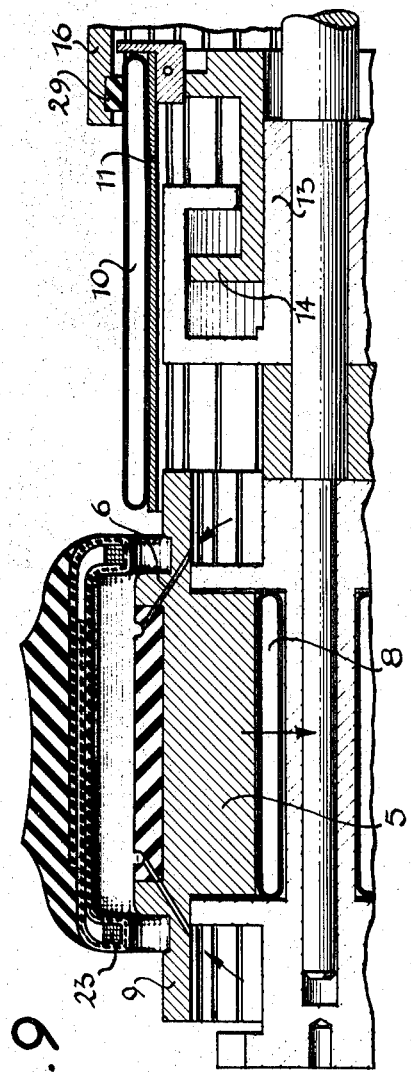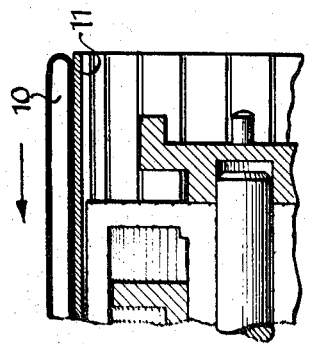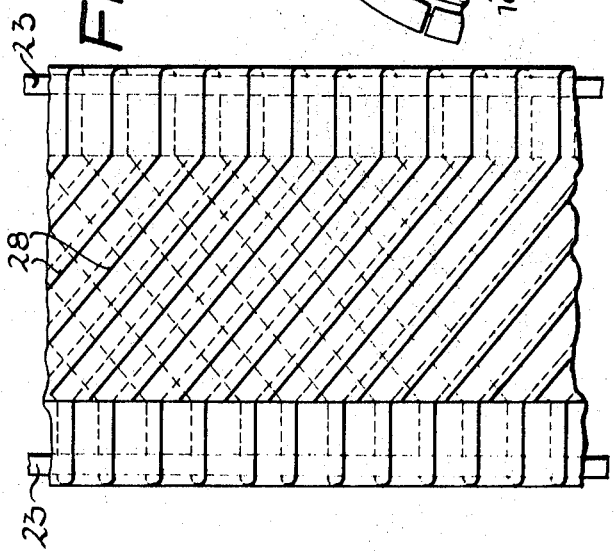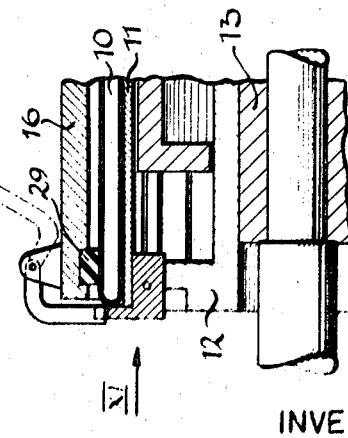

# United States Patent Office 3,542,624
Patented Nov. 24, 1970

3,542,624
APPARATUS FOR BUILDING UP PNEUMATIC VEHICLE TIRES
Heinrich Nädler, Hagen, and Hilmar Gesch, Hannover, Germany, assignors to Continental Gummi-Werke Aktiengesellschaft, Hannover, Germany
Filed Mar. 6, 1967, Ser. No. 620,910
Claims priority, application Germany, Mar. 8, 1966, C 38,425
Int. Cl. B29h 17/22
U.S. Cl. 156—401                        10 Claims

ABSTRACT OF THE DISCLOSURE

Expansible drum type tire building machine with inflatable bodies at the ends of the drum to receive the margins of fabric layers on the drum and expansible cylinders surrounding the inflatable bodies to grip the fabric margins thereto and rollingly supported on the inflatable bodies when the latter are inflated so as to be moveable axially over the drum to fold the fabric margins over bead cores on the drum.

---

The present invention relates to an apparatus for building up pneumatic vehicle tires, which comprises a building drum variable in diameter and also comprises bell-shaped members respectively arranged on opposite sides in axial direction of said drum, which are adapted in cooperation with foldable inflatable bodies to fold back fabric sections about the bead cores.

It is an object of the present invention to provide a device for building up pneumatic vehicle tires which will assure a particularly economic manufacture of high quality raw tires with fabric inserts folded back within the tread surface range.

It is another object of this invention to provide a device of the type set forth in the preceding paragraph which will permit the building up of the raw tires in conformity with the flat band method.

These and other objetcs and advantages of the invenion will appear more clearly from the following specification in connection with the accompanying drawings, in which:

FIG. 1 shows in side view and partially in section the overall device according to the invention and, more specifically, shows the various parts thereof at the start of the tire building-up operation.

FIGS. 2 to 9, respectively, illustarte successive working positions of the essential parts of the device while, for the sake of clarity each time only the upper half of the rotation symmetric parts have been shown.

FIGS. 2a, 4a and 9a, respectively, and diagrammatically illustrate top views of the fabric layers with the respective working condition of the device and in conformity with the thread location.

FIG. 10 is a modification of the end portiton of FIG. 2.

FIG. 11 illustrates an end view of FIG. 10 as seen in the direction of the arrow XI of FIG. 10.

Starting from a device of the character set forth in the opening paragraph to this specification, the apparatus according to the present invention is characterized primarily in that the inflatable bodies are arranged on a support respectively resting on a marignal portion of the tire building drum, and is furthermore characterized in that the bell-shaped members are variable in diameter.

Advantageously, the support for the inflatable bodies comprises segmental sheet members which are circumferentially curved and have those ends thereof which face away from the building drum journalled so as to be tiltable in radial planes about pivots located on a circle of uniform diameter. The support is thus able to follow any increase in diameter of the drum as it will occur during the manufacturing operation, whereas those ends of said support which face away from the building drum are fixed on a circle of nonvariable diameter. The variability in diameter of the support as well as of the inflatable bodies located thereon results in a uniform shape of the bell-shaped members since the said bell-shaped members must furnish the counter pressure forces when clamping the fabric layers with regard to the enclosed inflatable bodies. Moreover, in addition thereto, it is desirable, for purposes of folding back the fabric layers from one side, to be able to move the bell-shaped member over the bell-shaped member of the other side, which last mentioned bell-shaped member will then be smaller in diameter, and vice versa. When the bell-shaped members are built up of individual segmental bodies, the segmental bodies are preferably journalled bodies they are tiltable in radial planes about a pivot located within the longitudinal dimensions of said segmental bodies so that they will be able without difficulties to adapt themselves to different angular positions of the supports carrying the inflatable bodies. Desired changes in diameter of the bell-shaped members may be effected for instance by fluid pressure operable cylinder piston systems which at the pivots of the segmental bodies are operatively connected thereto. The structure of the apparatus according to the present invention also makes it possible to build up tires with fabric threads which at different circumferential areas of the cross section form different angles to the axial direction of the tire, when separate driving devices are provided for the building-up drum and the adjacent inflatable bodies at both sides of said drum with the supports and bell-shaped members pertaining thereto. In these circumstances, the segmental sheet members and the bell-shaped members can on one side be turned together and synchronously in opposite direction to the corresponding parts on the other side relative to the braked building drum until the desired angular location of the threads has been realized. In order to prevent an inadmissible loosening or upsetting of the threads, simultaneously with the angular distortion, an axial displacement of the two units—foldable bellows with support and bell-shaped members—is produced with regard to the building-up drum. To this end, the segmental sheets of the supports may be linked to the circumference of a piston member which is displaceable by a pressure fluid medium relative to the building-up drum. The stroke of the piston member in axial direction is so dimensioned that the segmental sheets will in each phase of the building-up operation find a sufficient surface on the building-up drum.

Referring now to the drawings in detail, the device shown in FIG. 1 comprises a stationary part 1 and a movable part 3 displaceable on guiding bars 2 in the longitudinal direction of the device. The stationary part 1 comprises a shaft 4 adapted to be driven and supporting the building drum 5. The outer circumference of building drum 5 is provided with a rubber sleeve 7 adapted through passages 6 selectively to be acted upon by compressed air or by a vacuum. Drum 5 is adapted by inflating an inner annular hose 8 to be enlarged to a larger outer diameter. The drum body has both end faces thereof stepped and thus together with the annular shoulders 9 forms supporting surfaces for the inflatable bodies 10 and the support therefor. The said support comprises a plurality of segmental sheets 11 resting at one end on one of the annular shoulders 9 and linked at the other end which faces away from the building drum to a rigid supporting ring 12 in such a way that said segmental sheets are able in response to a diameter increase of the annular shoulders 9 to tilt in radial planes and to spread apart in a fan-like manner. The supporting ring 12 is rotatable on a hollow shaft 13 surrounding the drum"

shaft 4 and at an axial extension carries a working piston 14 which in a sealing manner is guided in a cylinder 15 associated with the hollow shaft 13. The said working piston 14 is axially movable in opposite direction by being acted upon on either side by a pressure fluid medium. The same arrangement with the respective driving devices pertaining thereto is also provided for the left-hand side (with regard to the drawing) of the building-up drum 5 on the displaceable part 3. It is thus possible after the part 3 has been moved to the stationary part 1, to place the inflatable bodies 10 on opposite sides of the drum onto the annular shoulders 9 and to synchronously tilt the supporting segmental sheets 11 by expanding the drum. The required turning directions can be designed in any suitable manner.

Similar to the inflatable bodies 10 with the parts pertaining thereto, also the bell-shaped members 16 are arranged in pairs on opposite sides of the building drum 5 which means once in connection with part 1 and another time in connection with part 3 of the device. The said bell-shaped members 16 are likewise each composed of a plurality of segments so as to form annular or bell-shaped elements. Each individual segment has associated therewith an individual pressure fluid cylinder 18 mounted on a rigid housing ring 17 in order to bring about the radial displacement of the segments for increasing or decreasing the diameter of the bell-shaped members. Advantageously, the segments 16 have within the housing ring 17 a certain axial movability in order to be able to equalize the axial movements occurring during the clamping of the fabric layers when inflating the bodies 10, without the necessity of displacing the relatively heavy bell-shaped members with their driving devices. The operative connection between the segments and the working cylinders 18 is effected through central extensions 19 (FIGS. 3 to 8) in such a way that independently of the condition of operation of the working cylinders, also tilting movements of the segments in radial planes at an angle to the longitudinal axis of the main driving shaft 4 and drum 5 will be possible. At their end areas, the bell-shaped members 16 are provided with rubber rings 29 inserted in annular grooves. These rings 29 protrude beyond the inner wall of the segments and serve for establishing direct contact with the inflatable bodies 10 or the fabric layers of the raw tire to be clamped.

The displaceable part 3 has on longitudinal guiding means 20 the customary core holding segments 21 into which the bead cores 23 are inserted prior to the start of the building operations. The segments 21 are adapted to be moved in axial direction opposite to the core-receiving grooves 22 in the building drum. FIG. 2 shows the device with its essential elements at the start of the building-up operation. The movable part 3 has been moved to the stationary part 1. The segmental sheets 11 of the inflatable bodies 10 rest on the annular shoulders 9 on opposite sides of the building drum 5. The inflatable hose 8 within the building drum is vented so that the drum has been contracted to its smallest diameter and together with the likewise pressure-less or nearly pressure-less inflatable bodies forms a closed cylindrical wall on which the fabric layer 24 of the raw tire will be wound. The segmental sheets 11 are under the effect of pistons 14 located directly on the adjacent end faces of the building drum, whereas the bell-shaped members 16 have been returned to their outermost end position in order not to interfere with the placing of the fabric layer. In viewing the wrapped drum body, there are visible the individual fabric threads 28 extending over the entire width of the fabric layer at a uniform angle in conformity with the diagrammatic illustration in FIG. 2a.

The mounted fabric layer 24 is in the central portion thereon clamped against the drum 5 by connecting the annular sleeve 7 through passages 6 with a vacuum, whereas the marginal areas of the fabric layer 24 are clamped by advancing and contracting the bell-shaped members 16 after the bead cores 23 in the core-holding segments 21 have been placed into their intended positions (FIG. 3). In order to assure a reliable holding of the fabric layer below the front or inner rubber rings 29 within the bell-shaped members, it is advisable at this time to slightly inflate the inflatable bodies 10. In the simplified drawing, the pressure force of the working cylinder 18 which acts upon the segmental bodies of the bell-shaped member 16 is symbolized by a vector arrow. With stationary building drum 5, the supporting rings 12 with the bell-shaped members 16 can in conformity with FIG. 4 be turned relative to each other in the direction of the arrows I, II to such an extent that the fabric threads 28 will in the free areas between the clamping areas 7, 19 adjust themselves from the original angular position parallel to the longitudinal axis (FIG. 4a). The extension inherent thereto is compensated for by a simultaneous axial displacement of the rings 12 carrying the segmental sheets 11. This is effected by means of the fluid operable piston 14. This movement also brings the segmental sheets 11 out of the range of the core-receiving grooves 22 so that following the return of the core-holding segments 21, it is possible by subsequently inflating the annular hose 8 to expand the building drum 5 in order to pull the bead cores 23 into the receiving grooves (FIG. 5). The segmental sheets 11 resting on the drum shoulders are able in view of the fact that they are so journalled on the supporting rings 12 as to be able to rotate, to follow the increase in the drum diameter without difficulties. In an analogous manner, also the segmental bodies of the bell-shaped members tiltably suspended on their extensions 19 will adjust themselves at an incline with regard to the axial direction. The spreading movement of the parts 11, 16 can be aided by a simultaneous advancing movement of the pistons 14 in the direction toward the building drum 5 whereby also a disadvantageous stretching of the clamped fabric sections will be avoided.

Between the supporting rings 12 and the associated bell-shaped members, it is possible to provide a mechanical clutch by means of which a torsion-resistant connection can be established between these parts. Such clutch will take away from the relatively soft inflatable bodies 10 the function to act as torque transmitter and will prevent the danger of uncontrollable fabric distortions during the turning movement.

The folding back of the fabric margins about the bead cores 23 toward the central portion of the drum is subsequently effected from both sides. To this end, in conformity with FIG. 6, first the inner pressure of the inflatable body 10 is considerably increased on the left-hand side with regard to the drawing while simultaneously the bell-shaped member 16 pertaining thereto is increased in diameter to such an extent that the last mentioned bell-shaped member will be able in the course of the subsequent initiated axial displacement in the direction of the arrow III (FIG. 7) to move over the bell-shaped member on the other side of the drum. The inflatable body 10 which has only its front portion connected to the segmental sheets 11 rolls under the bell-shaped member while pressing the marginal portion of fabric 24 onto the layer surrounding the building drum 5. With the then vented inflatable body, the bell-shaped member returns to its starting position, and a corresponding operation is effected in conformity with FIG. 8 from the righthand side (with regard to the drawing) of the drum. The fabric margins folded back on both sides will then have the threads run in the direction as shown in the top view of FIG. 9a.

The raw tire built up so far will then be completed in the customary manner by mounting the still missing tire parts such as the tread strip and the like. For purposes of removing the finished raw tire from the building drum 5, the latter is in conformity with FIG. 5 again contracted or reduced in diameter by venting the annular hose 8 while the passages 6 instead of communicating with a vacuum are supplied with compressed air, whereas the movable part 3 of the device moves back to its starting position of FIG. 1. Immediately after the removal of the raw tire from the building drum, the device can then be again moved together for forming the next raw tire.

It is, of course, to be understood that the present invention is, by no means, limited to the particular construction shown in the drawings but also comprises any modifications within the scope of the invention.

What is claimed is:

1. In a tire building machine of the type in which fabric layers are placed on an expansible drum and bead cores are placed on the drum in axially spaced relation and the drum is then expanded and the marginal portions of the fabric layer are folded over the bead cores toward the center of the drum, the improvement comprising, flexible annular inflatable bodies at each end of the drum coaxial with the drum and over which the marginal portions of the fabric layers placed on the drum extend, supports inside the inflatable bodies resting at one end on the adjacent end of said drum and expansible and contractable at said one end with the drum and providing internal support for said inflatable bodies so the inflatable bodies will expand radially outwardly when inflated, and radially expansible and contractable cylindrical members surrounding said inflatable bodies and adapted grippingly to engage the outer surface of the marginal portions of the fabric layers resting on said bodies, said inflatable bodies being relatively long in the axial direction so as rollingly to support said cylindrical members whereby after the drum is expanded said inflatable bodies can be expanded and the marginal portions of the fabric folded over the bead cores by moving the cylindrical members toward the center of the drum while the respective inflatable bodies roll between the drum and the respective cylindrical member and carry the respective marginal portion of the fabric gripped between the inflatable body and the respective cylindrical member toward the center of the drum, said supports being formed of segments curved in transverse cross section, a support ring for each said support at the end thereof remote from said drum, and each segment being pivotally connected to its pertaining support ring.

2. A tire building machine according to claim 1, in which pivot-point means are provided with spacing variable in axial direction from said drum and each said support ring is moveable axially of said drum.

3. A tire building machine according to claim 2, in which a fluid motor has a piston member displaceable relative to the drum and pivot-point means are located at the circumference of said piston member including one part connected to the drum and another part connected to each said support ring for controlling the movement of the support rings in the axial direction.

4. A tire building machine according to claim 3, in which the difference between the maximum and minimum distance of said pivot-point means from the drum is less than the extent of the maximum axial overlap of the drum by the segments so that structurally the amount of axial overlap of the segments on the drum exceeds the stroke of said motors.

5. In a tire building machine of the type in which fabric layers are placed on an expansible drum and bead cores are placed on the drum in axially spaced relation and the drum is then expanded and the marginal portions of the fabric layers are folded over the bead cores toward the center of the drum, the improvement comprising, flexible annular inflatable bodies at each end of the drum coaxial with the drum and over which the marginal portions of the fabric layers placed on the drum extend, supports inside the inflatable bodies resting at one end on the adjacent end of said drum and expansible and contractable at said one end with the drum and providing internal support for said inflatable bodies so the inflatable bodies will expand radially outwardly when inflated, and radially expansible and contractable cylindrical member surrounding said inflatable bodies and adapted grippingly to engage the outer surface of the marginal portions of the fabric layers resting on said bodies, said inflatable bodies being relatively long in the axial direction so as rollingly to support said cylindrical members whereby after the drum is expanded said inflatable bodies can be expanded and the marginal portions of the fabric folded over the bead cores by moving the cylindrical members toward the center of the drum while the respective inflatable bodies roll between the drum and the respective cylindrical member and carry the respective marginal portion of the fabric gripped between the inflatable body and the respective cylindrical member toward the center of the drum, a support cylinder surrounding each cylindrical member in radially spaced relation thereto and respective fluid operable piston-cylinder means connected to each said segment and to said support cylinder to control the radial movement of said segments.

6. A tire building meachine according to claim 5, in which pivot-point means locate radial planes about which each said segment is tiltable about a transverse axis near the axial center of the respective segment.

7. A tire building machine according to claim 5, in which each said piston-cylinder means is pivotally connected to its respective segment in about the axial center thereof.

8. A tire building machine according to claim 5, in which a rigid housing ring is provided with respect to which said segments are axially moveable in their respective support cylinder.

9. A tire building machine according to claim 5, in which rubber-like rings are disposed inside said cylindrical members and project radially inwardly for engagement with said inflatable bodies and said marginal portions of said fabric.

10. A tire building machine according to claim 9, in which said segments have grooves therein in which said rubber-like rings are axially nondisplaceably mounted.

References Cited

UNITED STATES PATENTS

| | | | |
|---|---|---|---|
| 2,440,662 | 4/1948 | Frazier | 156—401 |
| 2,715,931 | 8/1955 | Frazier | 156—401 XR |
| 2,943,668 | 7/1960 | Trevaskis et al. | 156—401 |
| 2,998,049 | 8/1961 | Winslow | 156—401 XR |
| 3,111,443 | 11/1963 | Janzo et al. | 156—401 |
| 3,121,652 | 2/1964 | Borglin et al. | 156—132 XR |
| 3,438,832 | 4/1969 | Cantarutti | 156—401 |

BENJAMIN A. BORCHELT, Primary Examiner

S. C. BENTLEY, Assistant Examiner

U.S. Cl. X.R.

156—416